United States Patent
Hegler

(10) Patent No.: US 6,458,311 B1
(45) Date of Patent: Oct. 1, 2002

(54) METHOD FOR THE CONTINUOUS MANUFACTURE OF A TWIN-WALL PIPE HAVING A PIPE SOCKET

(76) Inventor: Ralph Peter Hegler, Schillerstrasse 7, D-97688 Bad Kissingen (DE)

( * ) Notice: Subject to any disclaimer, the term of this patent is extended or adjusted under 35 U.S.C. 154(b) by 0 days.

(21) Appl. No.: 09/413,254

(22) Filed: Oct. 6, 1999

(30) Foreign Application Priority Data

Oct. 21, 1998 (DE) .......................................... 198 48 470

(51) Int. Cl.⁷ .......................... B29C 47/06; B29C 49/04
(52) U.S. Cl. .................. 264/508; 264/511; 264/515; 264/167; 264/173.17; 264/40.7
(58) Field of Search ................... 264/508, 511, 264/515, 40.3, 40.7, 167, 173.17, 177.1; 425/133.1, 145, 326.1, 369, 388, 393, 396, 532

(56) References Cited

U.S. PATENT DOCUMENTS

| | | | | |
|---|---|---|---|---|
| 3,538,209 A | * | 11/1970 | Hegler | 264/508 |
| 3,891,733 A | * | 6/1975 | Maroschak | 425/133.1 |
| 3,994,646 A | * | 11/1976 | Hauck | 425/133.1 |
| 4,003,685 A | * | 1/1977 | Maroschak | 425/135 |
| 4,184,831 A | * | 1/1980 | Hegler et al. | 425/290 |
| 4,500,284 A | * | 2/1985 | Lupke | 425/511 |
| 4,534,923 A | * | 8/1985 | Lupke | 264/156 |
| 4,995,800 A | * | 2/1991 | Lupke | 425/133.1 |
| 5,124,109 A | * | 6/1992 | Drossbach | 264/508 |
| 5,320,797 A | | 6/1994 | Hegler | |
| 5,405,569 A | * | 4/1995 | Lupke | 264/504 |
| 5,472,659 A | | 12/1995 | Hegler | |
| 5,700,493 A | | 12/1997 | Scarazzo et al. | |
| 5,992,469 A | * | 11/1999 | Hegler | 138/109 |
| 6,045,347 A | * | 4/2000 | Hegler | 425/133.1 |

FOREIGN PATENT DOCUMENTS

| | | |
|---|---|---|
| EP | 0 385 465 | 10/1994 |
| WO | PCT/FI88/00005 | 7/1988 |

* cited by examiner

*Primary Examiner*—Stefan Staicovici
(74) *Attorney, Agent, or Firm*—Robert F I. Conte; Lee, Mann, Smith McWilliams, Sweeney & Ohlson

(57) ABSTRACT

For the continuous manufacture of a twin-wall pipe having a pipe socket and consisting of a smooth internal tube and an external tube, which is welded together therewith and provided with transverse grooves, two extruders are provided, which extrude an external tube and an internal tube via a joint crosshead. Switches are provided for the production of a pipe socket, by means of which the speed of the extruder is modified in such a way that the mass flow of the melt of plastic material for the production of the external tube is reduced during the production of the pipe socket and/or the mass flow for the production of the inner tube is augmented.

14 Claims, 6 Drawing Sheets

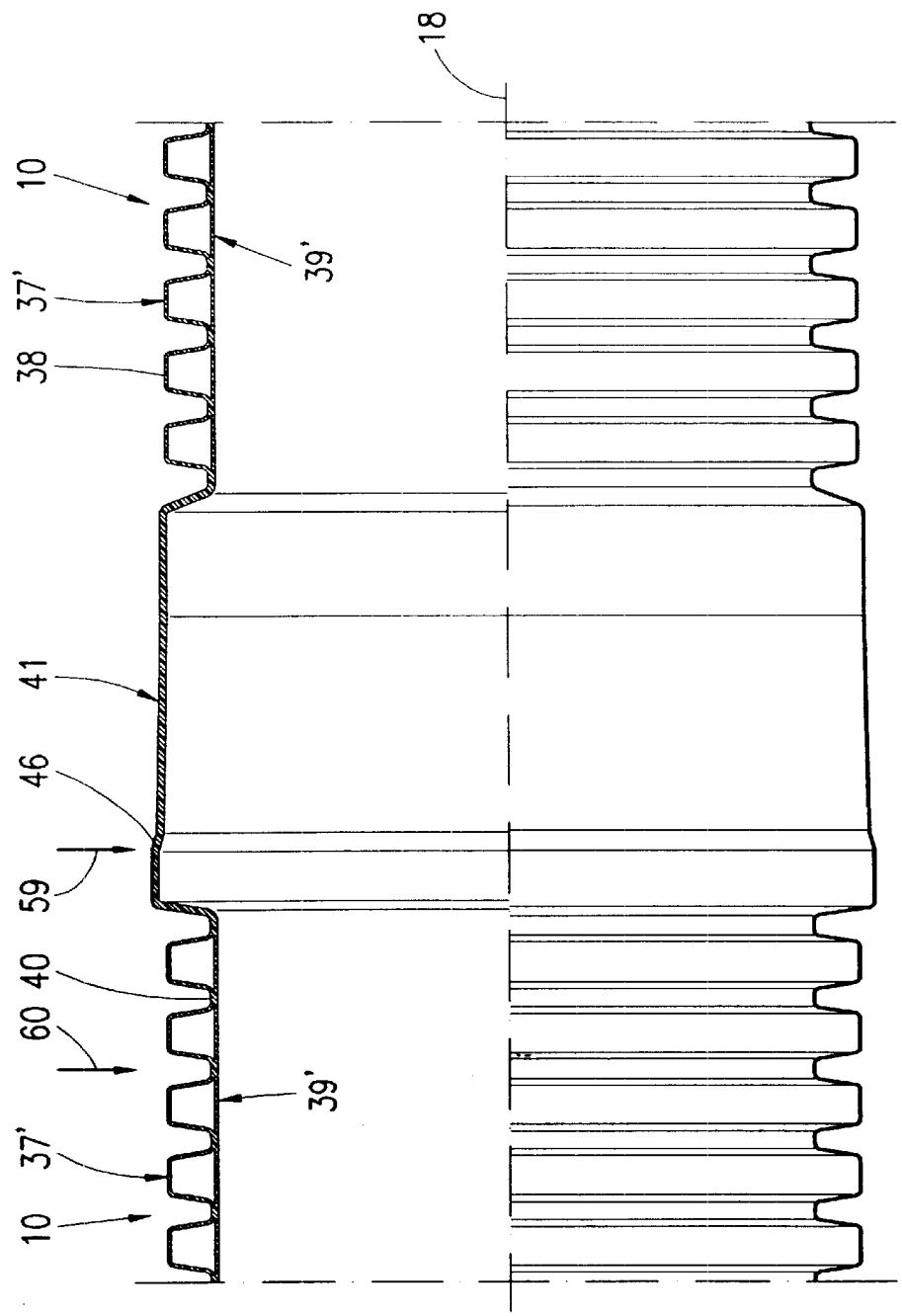

METHOD FOR THE CONTINUOUS MANUFACTURE OF A TWIN-WALL PIPE HAVING A PIPE SOCKET

BACKGROUND OF THE INVENTION

1. Field of the Invention

The invention relates to a method for the continuous manufacture of a twin-wall pipe having a pipe socket and consisting of a smooth internal tube and an external tube, which is welded together with the internal tube and which is provided with transverse grooves, and to an apparatus for putting this method into practice.

2. Background Art

A method and an apparatus of the generic type are known from U.S. Pat. No. 5,320,797. During the expansion of the external tube and the internal tube to form a pipe socket, the external tube and the internal tube are extruded more thick-walled than during the production of the twin-wall pipe provided with transverse grooves by the advancing speed of the half shells, which are on the molding path and combine to form molds, being reduced.

Similar methods are known from EP 0 385 465 B1 and WO 88/05377. Reduction of the take-off speed, i.e. the rate at which the internal tube and the external tube are taken off the extruder, does not always have the desired results. Due to the distance, conditioned by construction, of the internal die from the external die, any acceleration or deceleration of the molds results in that the desired modifications of wall thickness occur at places of the twin-wall pipe that may vary in the conveying direction. This interferes with the manufacturing process and also affects the twin-wall pipe negatively, in particular in the vicinity of the pipe socket. Furthermore, due to the predominantly smooth socket geometry, the melt flow for the external tube leads to increased wall thickness in the vicinity of the socket as compared to the area provided with transverse grooves. The contrary is true for the internal tube, which must be stretched beyond the outside diameter of the twin-wall pipe in the vicinity of the pipe socket. In the case of some materials, pipe diameters and wall thicknesses, these facts give rise to considerable drawbacks in the molding process.

SUMMARY OF THE INVENTION

It is an object of the invention to embody the method of the generic type such that the internal tube and the external tube each have the desired wall thickness during the production of the pipe socket, and to specify an apparatus for putting the method into practice.

According to the invention, this object is attained in a method of the generic type by the features which consist in extruding a mass flow of melt of plastic material per unit of time and forming an external tube having an inside and an outside; providing the external tube with a corrugation of transverse grooves and corrugation troughs by an overpressure acting from the inside to the outside; extruding a second mass flow of melt of plastic material per unit of time and forming an internal tube into the external tube; pressing the internal tube against the corrugation troughs of the external tube, thereby welding together the internal tube with the external tube; expanding panding the external tube at given intervals and by the application of the overpressure acting from the inside to the outside to form a substantially smooth-walled, approximately cylindrical pipe socket; and modifying at least one of the first and second mass flow of melt of plastic material per unit of time independently of the other one of the second and first mass flow of melt of plastic material per unit of time during the forming of the pipe socket. Due to the fact that at least one melt flow, i.e. the melt volume per time unit, and consequently also the quantity of melt per time unit at a constant temperature, i.e. the mass flow rate, can be modified, optimization of the wall thicknesses of the internal tube and external tube can be attained without any problems over the course of the pipe socket. As a rule, the melt flow for the external tube is maintained or reduced during the manufacture of the pipe socket and the melt flow for the internal tube is increased in order that a sufficient wall thickness be available for the stretching of the internal tube at the beginning of the socket. In the method according to the invention, it is possible without any problems to run a corresponding meltflow curve by corresponding triggering.

An apparatus which is suitable for putting the method into practice is specified by the features wherein half shells are arranged on a machine bed for circulation and guidance in a conveying direction, which half shells are provided with annular mold recesses and which combine in pairs on a molding path to form a mold with a central longitudinal axis; wherein at least one pair of half shells is provided with a socket recess; wherein means are provided for the production of relative overpressure acting from the inside to the outside; wherein a crosshead of a first extruder is disposed upstream of the molding path; wherein the crosshead is provided with an outer die for the extrusion of an external tube, and, downstream in the conveying direction, with an inner die for the extrusion of an internal tube, and, at a downstream end in the conveying direction, with a calibrating mandrel; wherein the inner die is connected to the first extruder; wherein a second extruder is provided; wherein the second extruder is connected to the outer die; wherein an extrusion rate of at least one of the first and second extruder is modifiable; and wherein switches are provided, by means of which the extrusion rate of said at least one of the first and second extruder is modified while the socket recess moves over one of the dies.

Further features, advantages and details of the invention will become apparent from the ensuing description of an exemplary embodiment, taken in conjunction with the drawing.

BRIEF DESCRIPTION OF THE DRAWING

FIG. 6 is an illustration of a twin-wall pipe with a socket produced on the apparatus.

DESCRIPTION OF THE PREFERRED EMBODIMENT

Figure 1:
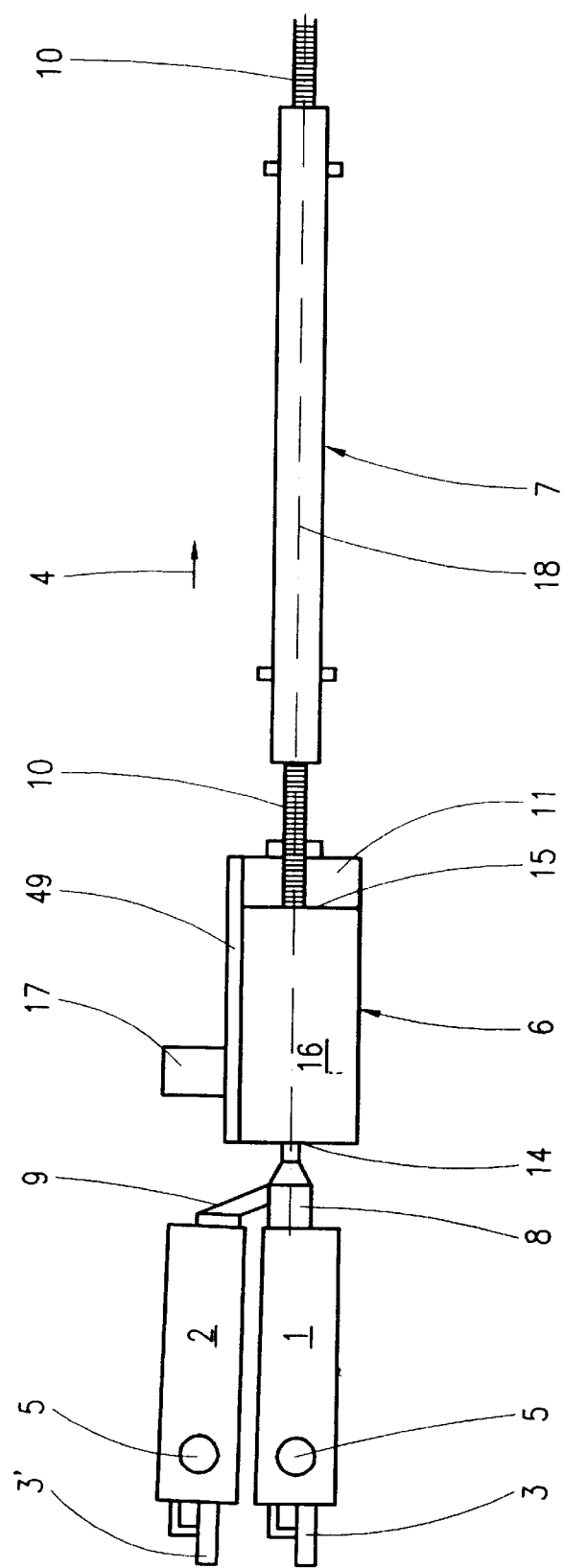
FIG. 1 is a diagrammatic plan view of an apparatus for the manufacture of twin-wall pipes with sockets which substantially comprises two extruders, a molding machine and an aftercooler.

The apparatus seen in FIG. 1 for the manufacture of twin-wall pipes comprises two extruders 1, 2. These are actuated by a speed-variable driving motor 3 and 3', respectively, which—referred to a conveying direction 4 of the entire apparatus—is provided upstream of the feed hoppers 5 of the extruders 1,2.

A molding machine 6, a so-called molder, is disposed downstream of the extruders 1, 2 related to the conveying direction 4, an aftercooler 7 being in turn disposed downstream of the molding machine 6. Mounted on an extruder 1, which is in alignment with the molding machine 6 and the after-cooler 7, is a crosshead 8 which projects into the molding machine 6. The other extruder 2, which is disposed by the side of this extruder 1, is connected to the crosshead 8 by way of an injection channel 9 which opens laterally into the crosshead 8. As diagrammatically outlined in FIG. 1, a twin-wall pipe 10 is molded in the molding machine 6, which discharges from the molding machine 6 in the conveying direction 4 and is cooled in the aftercooler 7. Downstream of this aftercooler 7, it may then be cut into pieces of suitable length.

The design of the molding machine 6 is known and commercial in practice. It is described for instance in U.S. Pat. No. 5,320,797, to which reference is made explicitly. It substantially comprises a machine bed 11 on which half shells 12, 12' are disposed which are combined to form two so-called chains 13, 13'. At their upstream inlet end 14 and downstream outlet end 15 —related to the conveying direction 4—these chains 13, 13' are guided over deflection pulleys (not shown). Upon circulation in the conveying direction 4, they are guided in such a way that two half shells 12, 12' at a time are united to form a mold pair, pairs of molds that succeed each other in the conveying direction 4 lying close together. Actuation of the half shells 12, 12', which are united on a molding path 16 to form pairs of molds, takes place by means of a driving motor 17.

The crosshead 8 comprises two melt channels disposed concentrically of a common central longitudinal axis 18, namely an inner melt channel 19 and an outer melt channel 20 which terminate downstream—related to the conveying direction 4—in an inner die 21 and an outer die 22, respectively. The inner melt channel 19 is connected to an injection channel 23 of the extruder 1 which is in alignment with the molding machine 6, whereas the outer melt channel 20 is connected to the injection channel 9 of the other extruder 2. Between the inner die 21 and the outer die 22, a gas duct 24 discharges from the crosshead 8, the gas duct 24 being connectable via a valve to a source of compressed gas for the injection of air on the one hand and to atmosphere or a partial vacuum on the other hand.

At the downstream end of the crosshead 8—related to the conveying direction 4—a calibrating mandrel 25 is mounted on the crosshead 8, likewise extending concentrically of the axis 18. It comprises cooling channels 26, through which coolant is guided, which is supplied via a coolant flow pipe 27 and discharged via a coolant return pipe 28. Furthermore, provision is made for an air pipe 29, which is connected to a gas gap 30 which serves as an additional gas duct and which—related to the conveying direction 4—is situated directly downstream of the inner die 21 between the crosshead 8 and the calibrating mandrel 25. The pipes 27, 28, 29 are guided through an approximately tubular supply channel 31 which is formed in the crosshead 8 concentrically of the axis 18.

The half shells 12, 12' have annular mold recesses 32 which are disposed one after the other at regular distances and which are connected to partial vacuum channels 33. Upon arrival of the half shells 12, 12' on the molding path 16, the partial vacuum channels 33 get into contact with partial vacuum supply sources 35, 36—as seen in FIG. 2—so that the mold recesses 32 are actuated by partial vacuum.

The melt of plastic material supplied from the extruder 2 through the injection channel 9 to the crosshead 8 flows through the outer melt channel 20 to the outer die 22, where it is extruded, forming an external tube 37. Due to the partial vacuum, this tube moves into the mold recesses 32, forming a tube provided with transverse grooves 38. Melt of plastic material is supplied from the extruder 1 through the injection channel 23 to the crosshead 8, streaming through the inner melt channel 19 towards the inner die 21, where it discharges as an internal tube 39 which arrives on the calibrating mandrel 25. This calibrating mandrel 25 expands from the inner die 21 slightly outwards in the conveying direction 4 until the internal tube 39 moves against the corrugation troughs 40 of the external tube 37 where it is welded together therewith. After cooling and when rigidifying, the internal tube 39 and the external tube 37 constitute the twin-wall pipe 10.

Figure 2:
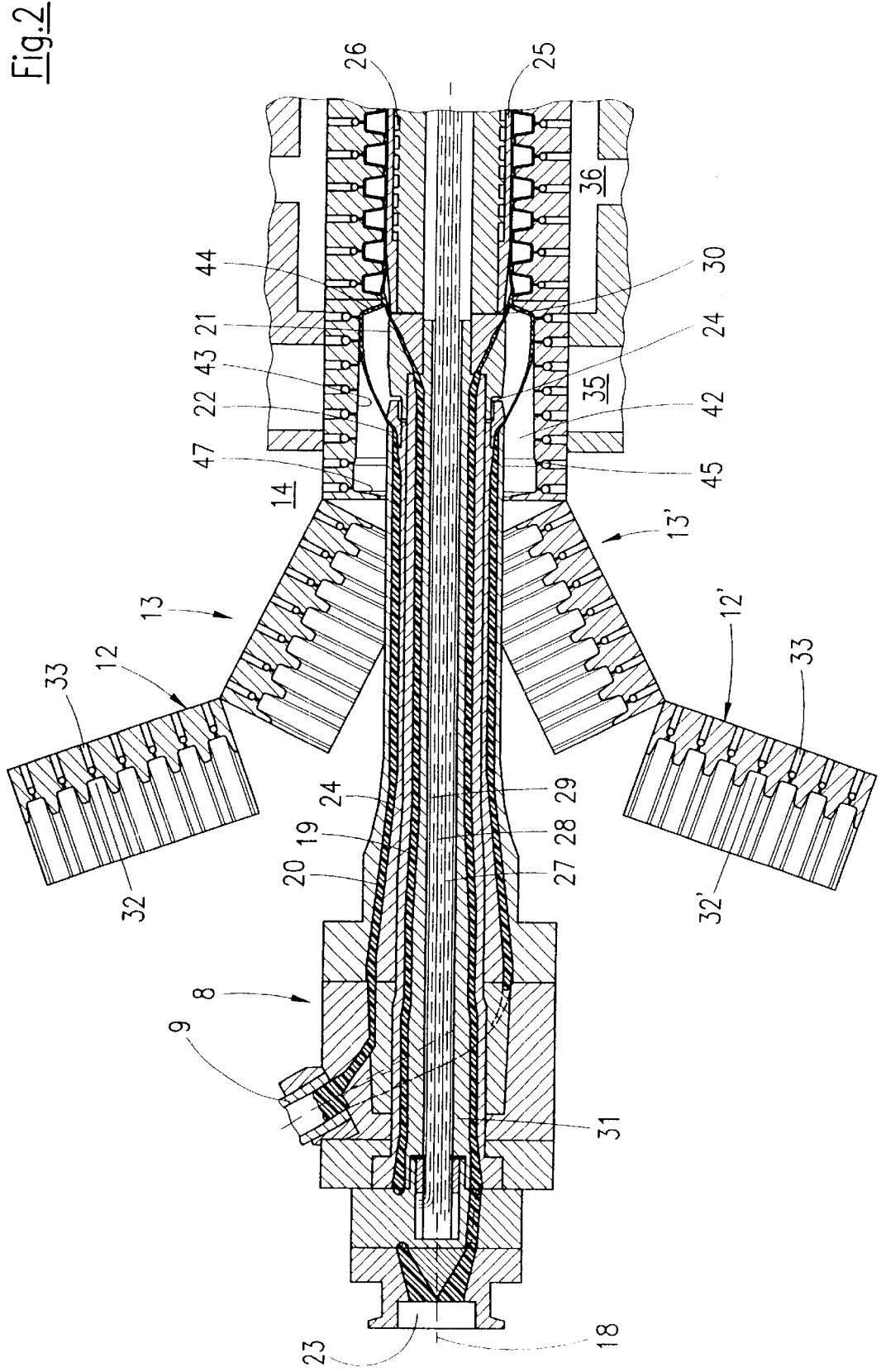
FIG. 2 is a horizontal section of a die head and of the inlet end of the molding machine.
Figure 3:
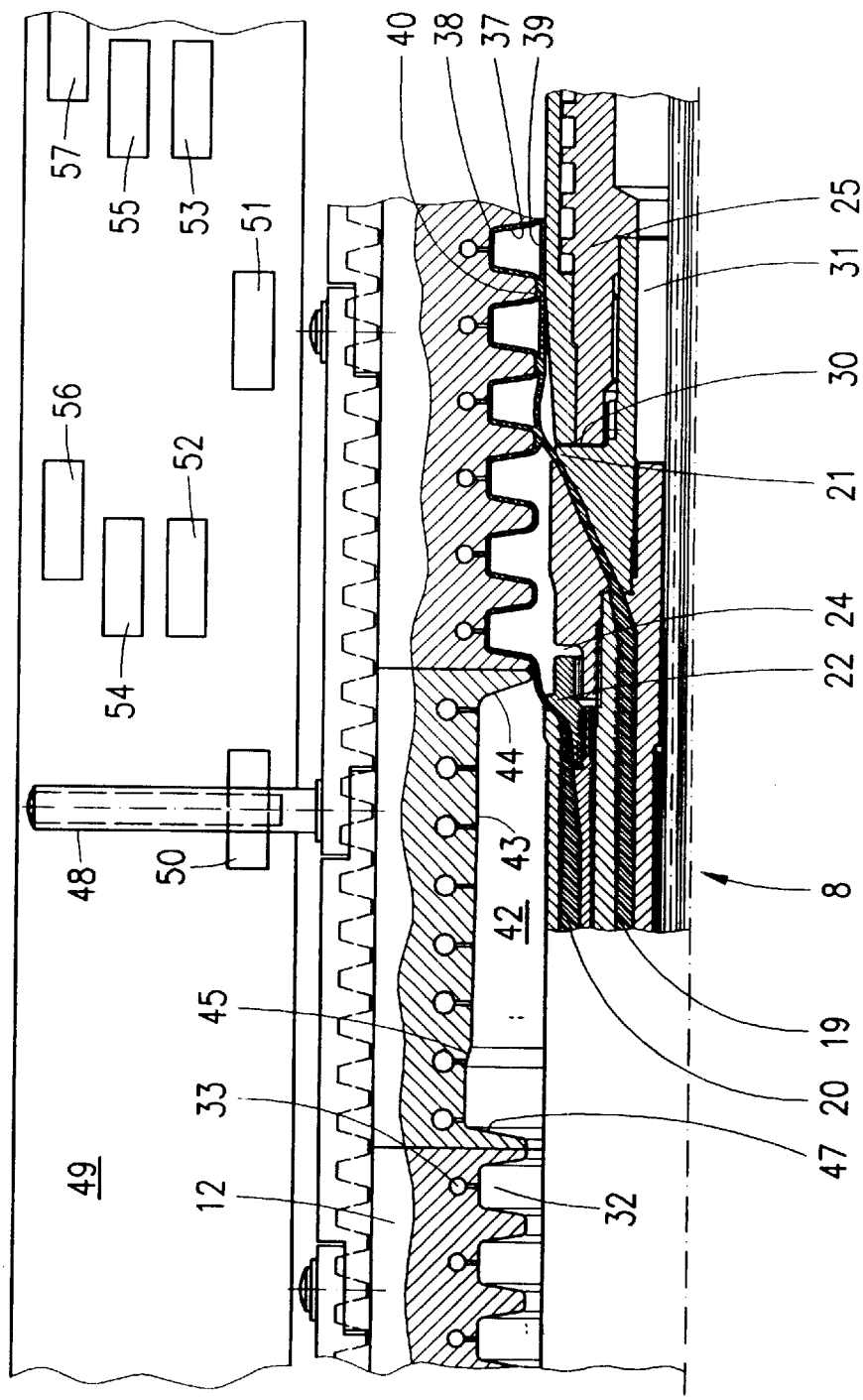
FIGS. 3 to 5 are vertical partial longitudinal sections through the molding machine in varying positions of a socket recess relative to the die head during the manufacture of a socket.
Figure 4:
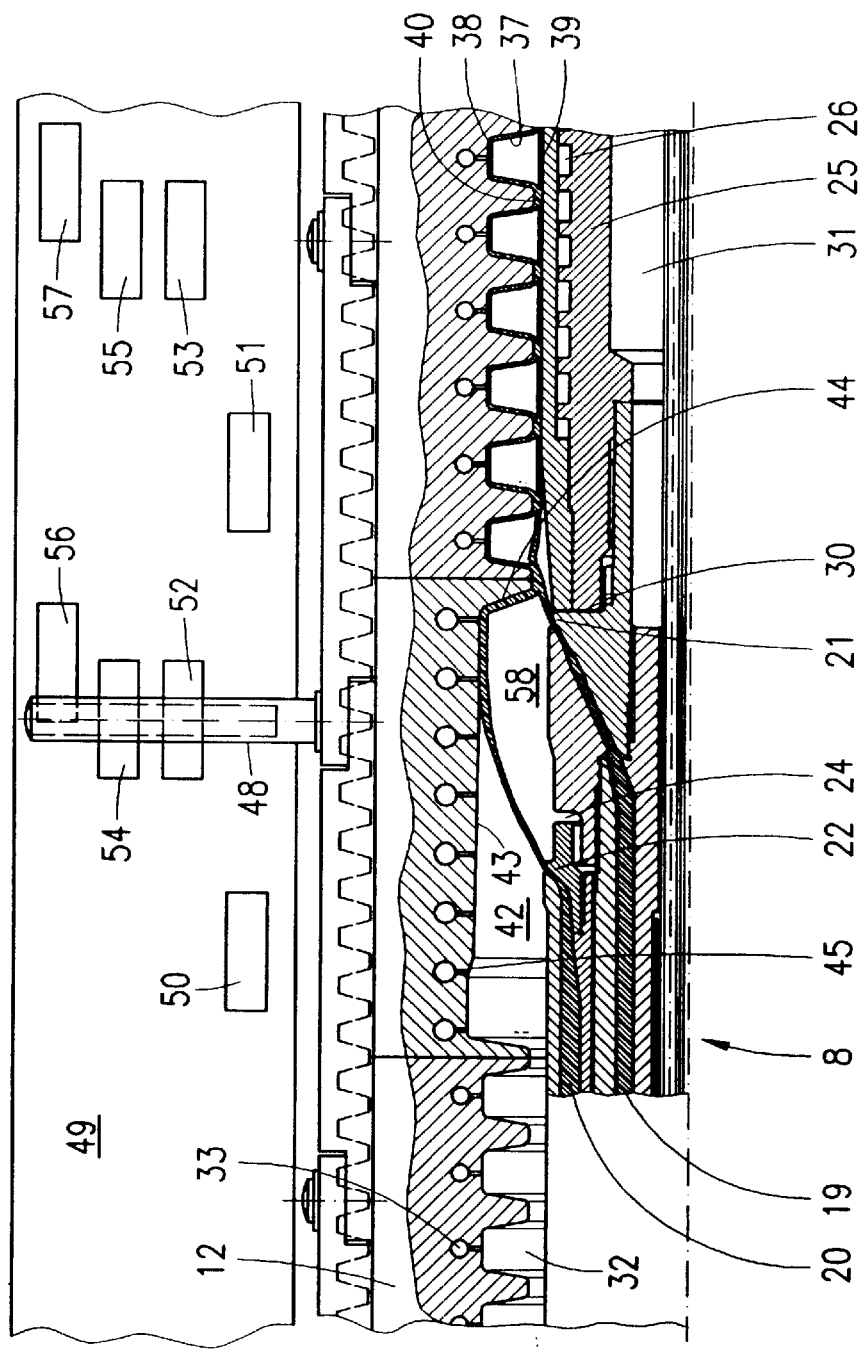

As seen in particular in FIGS. 2, 3, 4, the half shells 12, 12' are such that sockets 41 are formed at given intervals within the continuous twin-wall pipe 10. To this end, a substantially cylindrical socket recess 42, which has a substantially smooth cylindrical wall 43, is formed in a pair of half shells 12, 12'. A transition section 44 is formed between the wall 43 of the socket recess 42 and the mold recess 32 which leads in the conveying direction 4. The lagging end—in the conveying direction 4—of the wall 43 of the socket recess 42 is followed by a mold section 45 in the shape of a truncated cone, in which is molded an outwardly expanding insertion end 46 of the socket 41. This is again followed by a transition section 47 which leads to the next mold recess 32—lagging in the conveying direction 4.

Figure 5:
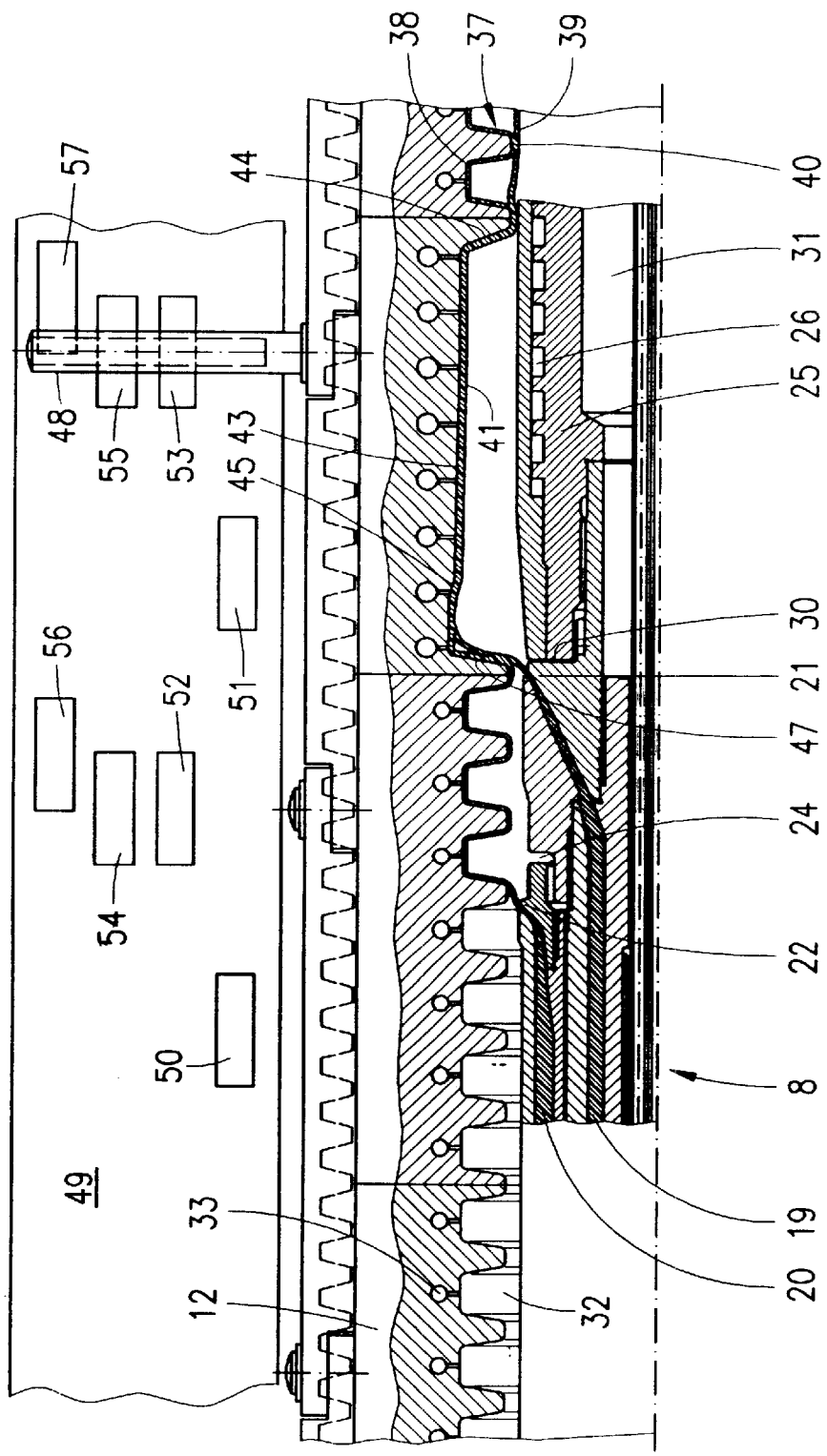

In spatially defined allocation to the socket recess 42, a rod-shaped control member 48 is connected to the corresponding half shell 12, operating switches in a manner still to be described, by means of which the speed is modified and thus the rate of extrusion of the extruders 1, 2 and by means of which the gas duct 24 and the gas gap 30, respectively, are supplied. To this end, a holding arm 49 is mounted on the molding machine 6, extending above the half shells 12, 12' in the conveying direction 4. Switches 50 to 57 to be operated by the control member 48 are mounted on this holding arm 49. These switches 50 to 57 are operated—as seen in FIGS. 3 to 5. The switches 50 to 57 are disposed in pairs one after the other in the conveying direction. The switches 50, 51 serve for modification of the speed of the extruder 2 which supplies the melt of plastic material for the production of the external tube 37. The switches 52, 53 serve for triggering the air which streams from the gas duct 24 and for venting via this gas duct 24. The switches 54, 55 serve for triggering the air that streams from the gas gap 30 on the calibrating mandrel 25. The switches 56, 57 serve for modification of the speed and thus of the rate of extrusion of the extruder 1 which supplies the melt of plastic material for the production of the internal tube 39. The switches 50 to 57 are operated when the control member 48 has reached the middle of each of the switches 50 to 57.

During the manufacture of the normal corrugated twin-wall pipe 10 in the shape shown on the right in FIG. 3, the external pipe 37 is pulled into the mold recesses 32 due to the partial vacuum and bears against them. Low pressure of 0.05 to 0.15 bar above atmospheric is applied to the gas gap 30. Simultaneously, equally low, but slightly higher pressure of 0.2 to 0.3 bar also above atmospheric is applied to the gas duct 24. The low overpressure within the internal tube 39 prevents the internal tube 39 from sticking to the calibrating mandrel 25 before it is welded together with the external tube 37. The slightly higher overpressure between the external tube 37 and the internal tube 39 ensures that the internal tube does not bulge outwards upon cooling of the tubes 38, 39 which are welded together at the corrugation troughs 40 to form the corrugated twin-wall pipe 10. Upon cooling of the tubes 37, 39 accurate atmospheric pressure results between them. During this manufacture of the normal corrugated twin-wall pipe 10, the extruders 1, 2 run at a given speed, i.e. they extrude a constant mass flow of melt of plastic material per time unit.

When the transition section 44 moves into the vicinity of the outer die 22 in the instant illustrated in FIG. 3, the control member 48 reaches the first switch 50—seen in the conveying direction 4—by actuation of which the driving motor 3' of the extruder 2 is reduced in speed so that the extrusion rate, i.e. the mass flow of melt of plastic material per time unit, is reduced. The reduction of the speed of the extruder 2 has the effect that the external tube 37 which comes to rest on the transition section 44 and the wall 43 of the socket recess 42 receives less plastic material per unit of length of the twin-wall pipe 10 than in the vicinity of the normal corrugated twin-wall pipe 10 where an external tube 37' is formed from it, having transverse grooves 38.

When the transition section 44—corresponding to the illustration in FIG. 4 reaches the inner die 21, the control member 48 arrives at the switches 52 and 54. The actuation thereof achieves that the overpressure of the air escaping from the gas gap 30 is increased for instance to a pressure above atmospheric of approximately 0.2 to 0.45 bar. Simultaneously, by actuation of the switch 54, the overpressure is taken from the gas duct 24 which is connected to a vacuum source or to atmosphere so that the space 58 between the internal tube 39 and the external tube 37 is vented in the vicinity of the socket recess 42 for the internal tube 39 to be pressed outwards against the external tube 37. Shortly afterwards, namely when the control member 48 has reached the switch 56, i.e. when the transition section 44 has moved beyond the inner die 21, then the driving motor 3 of the extruder 1 is triggered by actuation of the switch 56 in such a way that its speed is increased, i.e. the mass flow of melt of plastic material extruded per time unit is augmented. Consequently, the internal tube 39 receives more melt of plastic material per unit of length in the vicinity of the socket 41 to be produced than in the vicinity of the normal corrugated twin-wall pipe 10 where only the smooth-walled internal tube 39' is formed from it.

When the transition section 47 of the socket recess 42 moves beyond the outer die 22, the control member 48 operates the switch 51, whereby the extrusion rate of the extruder 2 which furnishes the outer tube 37 is again increased to the original rate. The extruder 2 again supplies the quantity of melt of plastic material per unit of time which is necessary for the production of the transverse grooves 38.

When the transition section 47 reaches the inner die 21, the control member 48 operates the switches 53, 55 in accordance with the illustration in FIG. 5, whereby the gas pressure at the gas gap 30 is again reduced and the gas duct 24 is actuated by compressed air or air flowing between the external and the internal tube. When the transition section 47 has moved beyond the inner die 21, the driving motor 3 is triggered by actuation of the switch 57 and the extrusion rate of the extruder 1 is reduced to the original rate so that again the quantity of melt of plastic material per unit of time is extruded, which is needed for the production of the smooth internal tube 39'.

The apparatus substantially differs from the apparatus described in U.S. Pat. No. 5,320,797 by the existence of two extruders 1, 2 and by the triggering and modification of the flow rates of plastic melt ensured by the switches 50, 51, FIG. 6 illustrates the finished extruded twin-wall pipe. Subsequent to the aftercooler it is cut through by two severing cuts 59, 60 roughly outlined by arrows by means of a known cutting device, i.e. the pipe section between the insertion end 46 of the pipe socket 41 and one of the ensuing, fully formed corrugation troughs 40 is cut out.

What is claimed is:

1. A method for the continuous manufacture of a twin-wall pipe (10) having a pipe socket (41) and consisting of a smooth internal tube (39') and an external tube (37'), which is welded together with the internal tube (39') and which is provided with transverse grooves (38), comprising the following method steps:

extruding a first mass flow of melt of plastic material per unit of time and forming an external tube (37) having an inside and an outside;

providing the external tube (37) with a corrugation of transverse grooves (38) and corrugation troughs (40) by an over pressure acting from the inside to the outside;

extruding a second mass flow of melt of plastic material per unit of time and forming an internal tube (39) into the external tube (37);

pressing the internal tube (39) against the corrugation troughs (40) of the external tube (37), thereby welding together the internal tube (39) with the external tube (37);

expanding the external tube (37) at given intervals and by the application of the over pressure acting from the inside to the outside to form a substantially smooth-walled, approximately cylindrical pipe socket (41) and a transition section between a corrugation trough (40) and the pipe socket (41);

expanding the internal tube (39) during expanding the external tube (37) and pressing the internal tube (39) outwards against the socket (41);

keeping constant the first and second mass flow of melt of plastic material per unit of time during providing the external tube (37) with a corrugation of transverse grooves (38) and corrugation troughs (40); and modifying at least one of the first and second mass flow of melt of plastic material per unit of time independently of the other one of the second and first mass flow of melt of plastic material per unit of time during the forming of the pipe socket (41) and the transition section.

2. A method according to claim 1, wherein the first mass flow for forming the external tube (37) is reduced during the forming of the pipe socket (41).

3. A method according to claim 1, wherein the second mass flow for forming the internal tube (39) is augmented during the forming of the pipe socket (41).

4. A method according to claim 1, wherein the overpressure acting from the inside to the outside is generated at least partially by a partial vacuum applied from outside.

5. A method according to claim 1, wherein after the internal tube (39) has been extruded into the external tube (37) and before the internal tube (39) is pressed against the corrugation troughs (40) of the external tube (37), gas at a pressure above atmospheric pressure is blown into an area between the external tube (37) and the internal tube (39).

6. A method according to claim 1, wherein a space (58) between the outer tube (37) and the inner tube (39) is vented while the outer tube (37) and the inner tube (39) are expanded to form a pipe socket (41).

7. A method according to claim 1, wherein the internal tube (39), when expanded to form a pipe socket (41), is actuated from within by gas at a pressure above atmospheric pressure and is pressed substantially over its full surface against the external tube (37).

8. A method for the continuous manufacture of a twin-wall pipe (10 having a pipe socket (41) and consisting of a smooth internal tube (39') and an external tube (37') which is welded together with the internal tube (39') and which is provided with transverse groove (38), comprising the following method steps:

providing circulating half shells (12, 12') to form a mold which is guided in a conveying direction (4);

extruding a first mass flow of melt of plastic material per unit of time into the mold and forming an external tube (37) having an inside and an outside;

providing the external tube (37) with a corrugation of transverse grooves (38) and corrugation troughs (40) by an over pressure acting from the inside to the outside;

extruding a second mass flow of melt of plastic material per unit of time and forming an internal tube (39) into the mold;

pressing the internal tube (39) against the corrugation troughs (40) of the external tube (37), thereby welding together the internal tube (39) with the external tube (37);

expanding the external tube (37) at given intervals and by the application of the over pressure acting from the inside to the outside to form a substantially smooth-walled, approximately cylindrical pipe socket (41) and a transition section between a corrugation trough (40) and the pipe socket (41); expanding the internal tube (39) during expanding the external tube (37) and pressing the internal tube (39) outwards against the socket (41);

keeping constant the first and second mass flow of melt of plastic material per unit of time during providing the external tube (37) with a corrugation of transverse grooves (38) and corrugation troughs (40); and modifying at least one of the first and second mass flow of melt of plastic material per unit of time independently of the other one of the second and first mass flow of melt of plastic material per unit of time during the forming of the pipe socket (41) and the transition section.

9. A method according to claim 8, wherein the first mass flow for forming the external tube (37) is reduced during the forming of the pipe socket (41).

10. A method according to claim 8, wherein the second mass flow for forming the internal tube (39) is augmented during the forming of the pipe socket (41).

11. A method according to claim 8, wherein the overpressure acting from the inside to the outside is generated at least partially by a partial vacuum applied from outside.

12. A method according to claim 8, wherein after the internal tube (39) has been extruded into the external tube (37) and before the internal tube (39) is pressed against the corrugation troughs (40) of the external tube (37), gas at a pressure above atmospheric pressure is blown into an area between the external tube (37) and the internal tube (39).

13. A method according to claim 8, wherein a space (58) between the outer tube (37) and the inner tube (39) is vented while the outer tube (37) and the inner tube (39) are expanded to form a pipe socket (41).

14. A method according to claim 8, wherein the internal tube (39), when expanded to form a pipe socket (41), is actuated from within by gas at a pressure above atmospheric pressure and is pressed substantially over its full surface against the external tube (37).

* * * * *